United States Patent
Choi et al.

(10) Patent No.: US 10,565,285 B2
(45) Date of Patent: Feb. 18, 2020

(54) PROCESSOR AND MEMORY TRANSPARENT CONVOLUTIONAL LOWERING AND AUTO ZERO PADDING FOR DEEP NEURAL NETWORK IMPLEMENTATIONS

(71) Applicant: International Business Machines Corporation, Armonk, NY (US)

(72) Inventors: Jungwook Choi, Elmsford, NY (US); Bruce Fleischer, Bedford Hills, NY (US); Vijayalakshmi Srinivasan, New York, NY (US); Swagath Venkataramani, Yonkers, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 57 days.

(21) Appl. No.: 15/845,390

(22) Filed: Dec. 18, 2017

(65) Prior Publication Data

US 2019/0188240 A1    Jun. 20, 2019

(51) Int. Cl.
*G06F 17/16* (2006.01)
*G06N 3/02* (2006.01)

(52) U.S. Cl.
CPC ............ *G06F 17/16* (2013.01); *G06N 3/02* (2013.01)

(58) Field of Classification Search
None
See application file for complete search history.

(56) References Cited

U.S. PATENT DOCUMENTS 9,373,059 B1    6/2016  Heifets et al.
9,836,691 B1 *  12/2017  Narayanaswami ...... G06N 3/04
(Continued)

FOREIGN PATENT DOCUMENTS

WO    2014145150 A1    9/2014

OTHER PUBLICATIONS

Anonymous, "Methods for Deep Learning Network Compression for Resource constrained Devices," Electronic Publication Date: Jun. 21, 2016, 5 pages.
(Continued)

*Primary Examiner* — Michael D. Yaary
(74) *Attorney, Agent, or Firm* — Amin, Turocy & Watson, LLP

(57) ABSTRACT

A convolutional lowering component (CoLor component) between processor and memory units (or within a memory hierarchy) maps location in a lowered matrix to an equivalent location in a non-lowered matrix and provides auto zero padding in computational heavy convolutional layers. An identification component identifies processing components that execute computations in deep neural networks (DNNs) in which convolutions are realized as general matrix to matrix multiplications (GEMM) operations, and identifies a subset of the processing components that store deep neural network (DNN) features in a non-lowered form component that determines output for successively larger neural networks of a set. An address translation component translates address requests, generated by the subset of processing components to a memory subsystem, from a lowered index form to a non-lowered index form.

20 Claims, 8 Drawing Sheets
(5 of 8 Drawing Sheet(s) Filed in Color)

(56) References Cited

U.S. PATENT DOCUMENTS

| | | | |
|---|---|---|---|
| 2010/0235419 A1 | 9/2010 | Yamamoto | |
| 2016/0342888 A1* | 11/2016 | Yang | G06N 3/063 |
| 2018/0046903 A1* | 2/2018 | Yao | G06N 3/0481 |
| 2018/0075344 A1* | 3/2018 | Ma | G06F 7/026 |
| 2018/0307981 A1* | 10/2018 | Cilingir | G06F 9/3001 |
| 2018/0322382 A1* | 11/2018 | Mellempudi | G06N 3/0445 |
| 2019/0079764 A1* | 3/2019 | Diamond | G06F 9/3001 |
| 2019/0114529 A1* | 4/2019 | Ng | G06N 3/0454 |

OTHER PUBLICATIONS

Anonymous, "An FPGA Architecture for Accelerating Convolutional Neural Network in Speech Recognition," Electronic Publication Date: Aug. 11, 2016, 5 pages.

Anonymous, "Deriving Graph Structures Within Deep Architectures for Robust Handling of Limited Training Data," Electronic Publication Date: Mar. 15, 2017, 5 pages.

* cited by examiner

PROCESSOR AND MEMORY TRANSPARENT CONVOLUTIONAL LOWERING AND AUTO ZERO PADDING FOR DEEP NEURAL NETWORK IMPLEMENTATIONS

TECHNICAL FIELD

The subject disclosure relates generally to memory and bandwidth benefits provided to DNN (Deep Neural Networks) by implementing a convolutional lowering component (CoLor component) between processor and memory units (or within a memory hierarchy) that maps location in a lowered matrix to an equivalent location in a non-lowered matrix and provides auto zero padding in computational heavy convolutional layers.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate the production of a final product using neural networks in a particular context are described.

The subject invention introduces an intermediate convolutional lowering (CoLor) component that optimizes computing required to facilitate such processes. The CoLor component implements an address translation logic, that is transparent to both processor and memory sub-systems. Software executing on the processor still implements convolutional layers as a GEMM operation, producing memory requests for indices in the lowered input feature matrix. However, the input features are stored in memory only in the non-lowered form. The memory request from the processor is first received by the CoLor component. The CoLor component maps location(s) in the lowered matrix to equivalent location(s) in non-lowered input feature representation. The modified memory request is sent to the memory subsystem, which then transmits the data back to the processor. The CoLor component substantially reduces memory foot-print by $K^2$ times, where K is convolution kernel/filter window size, (therefore potentially negating the $K^2$ replication expansion. It also improves bandwidth, as multiple requests from the processor map to a same location in memory can be merged together. The CoLor component can streamline zero padding in convolution. When a memory request reaches the CoLor component and it identifies an access location to fall within a zero-padded region, it simply returns a zero back to the processor, without forwarding the request to a memory subsystem.

According to an embodiment, a system comprises a memory that stores computer executable components, and a processor that executes computer executable components stored in the memory. The computer executable components comprise an identification component that identifies processing components that execute computations in deep neural networks (DNNs) in which convolutions are realized as general matrix to matrix multiplications (GEMM) operations, and identifies a subset of the processing components that store deep neural network (DNN) features in a non-lowered form component that determines output for successively larger neural network layers of a set; and an address translation component that translates address requests, generated by the subset of processing components to a memory subsystem, from a lowered index form to a non-lowered index form.

In accordance with yet another embodiment, a computer implemented method comprises: identifying by a system operatively coupled to a processor that is operatively coupled to a memory, processing components that execute computations in deep neural networks (DNNs) in which convolutions are realized as general matrix to matrix multiplications (GEMM) operations, and identifies a subset of the processing components that store deep neural network (DNN) features in a non-lowered form; and translating by the system, address requests, generated by the subset of processing components to a memory subsystem, from a lowered index form to a non-lowered index form.

Another embodiment includes a computer program product having stored thereon the aforementioned computer executable components.

DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
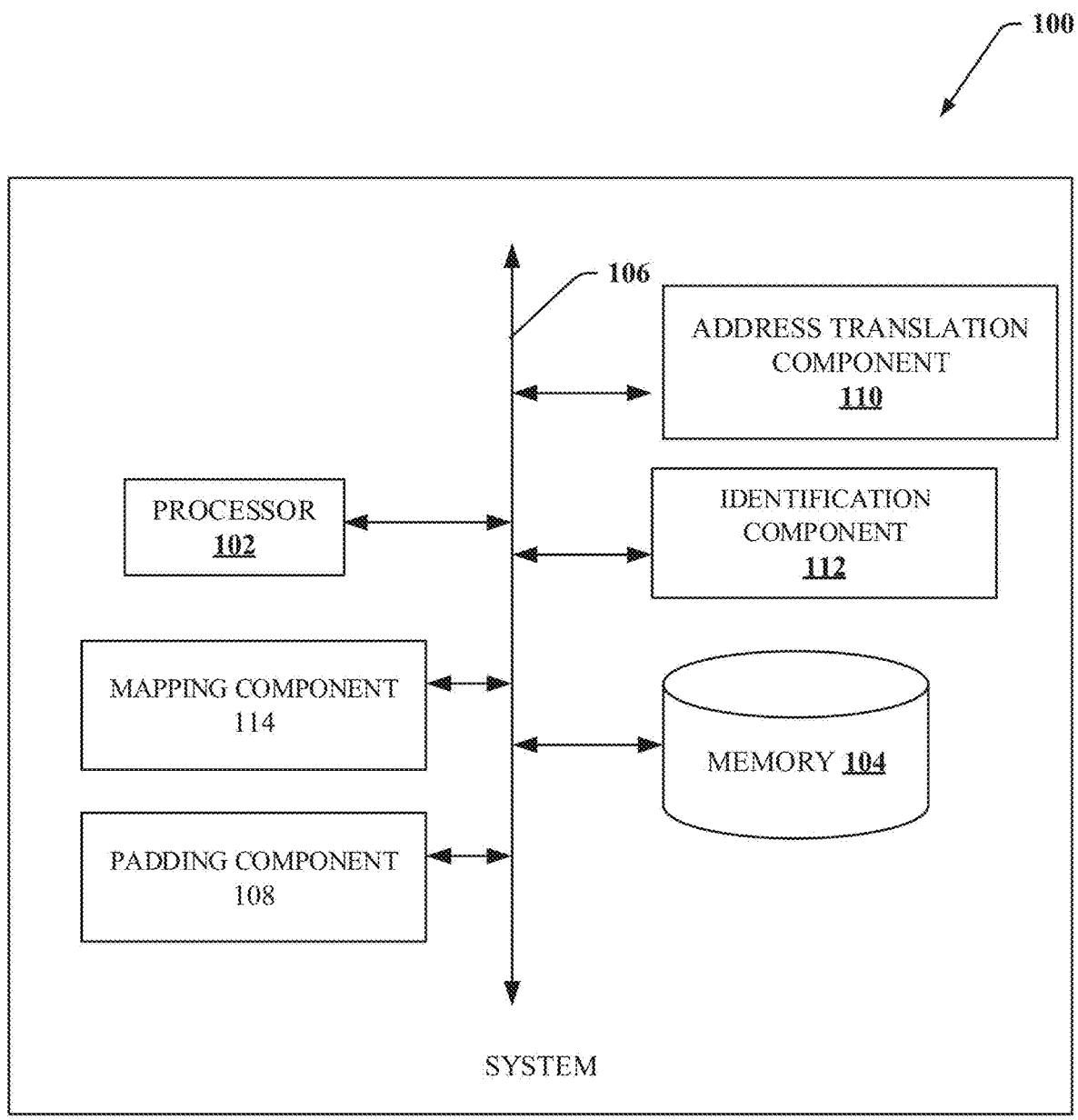
FIG. 1 illustrates a block diagram of an example system implemented that can exploit a convolutional lowering unit model to reduce total memory and CPU resources required in connection with optimizing neural networks.

The following detailed description is merely illustrative and is not intended to limit embodiments and/or application or uses of embodiments. Furthermore, there is no intention to be bound by any expressed or implied information presented in the preceding Summary section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details. The concept of neural networks (for this content CNN will be used as an acronym to represent a convolutional neural network) refers to computing systems inspired by biological neural networks that learn to do tasks by considering examples generally without task-specific programming. The original goal of the neural network approach was to solve problems in same manner as a human brain. Over time, attention focused on matching specific mental abilities, leading to deviations from biology such as backpropagation (a method to calculate gradient of a loss function (produces the cost associated with a given state) with respect to weights in the CNN) or passing information in a reverse direction and adjusting the network to reflect that information. For example, in image recognition, CNNs might learn to identify images that contain facial features by analyzing example images that have been manually labeled as "facial feature" or "no facial feature" and using the analytic results to identify faces in other images. In artificial networks with multiple hidden layers, initial layers might detect primitives (e.g. pupil in an eye, an iris, eyelashes, etc.) and the output is fed forward to deeper layers that perform more abstract generalizations (e.g. eye, mouth . . . ) and so on until final layers perform complex object recognition (e.g. face) CNNs have found most use in applications difficult to express in a traditional computer algorithm using rule-based programming One or more embodiments described herein provides for generation and employment of neural network model(s) that facilitate identifying and processing data to achieve an intended result of an optimized neural network that reduces consumption of CPU, memory capacity, and bandwidth resources. Employing neural networks for various computational objectives can be difficult based on typical requirements needed to accomplish such tasks. Intense data interaction and CPU usage can be limiting in achieving quality results. High resolution images or videos are often employed as inputs to neural networks for recognition and inference operations. Large neural network sizes can be due to substantial input pixel count and hidden layer sizes. In the current state of art, images can contain tremendous amounts of data of up to and over 160 billion parameters. The length of time and computing power for processing this level of data can be prohibitive to completing a desired classification task. Accordingly, there is a need for highly efficient computing on the edge, particularly for domains such as Cognitive Internet-of-Things (IoT) and data mining within storage that can utilize exabytes up to and including yottabytes ($1000^8$ bytes).

A basic neural network uses neurons as a base unit; in the state of the art, neurons are arranged in layers and each layer is connected sequentially. A pre-dominant layer in the network is referred to as a convolutional layer; convolution layers dominate overall computing, as much as 90% in many state-of-the-art DNNs. Therefore, this layer consumes vast majority of computing resources (e.g., CPU, memory, bandwidth, etc.) to carry out its tasks. It is desirable to optimize a computing platform to efficiently execute this layer.

The subject innovation facilitates reduction in amount of memory utilized and amount of data transmitted between a computer processing unit (CPU) and memory, or between a centralized parameter server and multiple distributed computing nodes in connection with improving efficiency and performance of a neural network. In the state of the art, in most parallel software implementations, convolutional layers are cast as a computation intensive matrix-multiplication, General Matrix to Matrix Multiplication (GEMM) operation. GEMM multiplies two input matrices together to obtain an output matrix. This is achieved through a process referred to as lowering, in which input features to a layer are used to form a larger lowered matrix. Lowering results in elements in respective input feature to be replicated $K^2$, where K is the size of a kernel window; each kernel is another three-dimensional array of numbers, with depth the same as an input image, but with significantly smaller width and height. Window sizes in typical convolutional layers range from small 3×3, to larger 11×11 in some cases, resulting in a lowered matrix being 9×-121× larger than size of the input features. The concept of lowering introduces substantial increase in memory footprint, and potentially bandwidth as the same data is redundantly transported across different levels of the memory hierarchy to train a neural network. The subject invention introduces an intermediate convolutional lowering (CoLor) component that optimizes computing required to facilitate such processes. The CoLor component implements an address translation logic, that is transparent to both processor and memory sub-systems. Software executing on the processor still implements convolutional layers as a GEMM operation, producing memory requests for indices in the lowered input feature matrix.

However, the input features are stored in memory only in the non-lowered form. The memory request from the processor is first received by the CoLor component. The CoLor component maps location(s) in the lowered matrix to equivalent location(s) in non-lowered input feature representation. The modified memory request is sent to the memory subsystem, which then transmits the data back to the processor. The CoLor component substantially reduces memory foot-print by $K^2$ times (therefore potentially negating the $K^2$ replication expansion (as referred to previously during the lowering process). It also improves bandwidth, as multiple requests from the processor map to a same location in memory, and requests can be merged together. In addition, the CoLor component can streamline zero padding in convolution. When a memory request reaches the CoLor component and it identifies an access location to fall within a zero-padded region, it simply returns a zero back to the processor, without forwarding the request to a memory subsystem.

FIG. 1 illustrates a block diagram of an example, non-limiting system 100 (also referred to herein as a CoLor component) that facilitates analyzing large sets of data and training a neural network to provide an optimum result in a particular context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System (Color Component) 100 can optionally include a server device, one or more networks and one or more devices (not shown). The CoLor component 100 can also include or otherwise be associated with at least one processor 102 that executes computer executable components stored in memory 104. The system 100 can further include a system bus 106 that can couple various components including, but not limited to, a padding component 108, an address translation component 110, an identification component 112, and a mapping component 114. The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 100 and/or any other suitable device that can employ information provided by system 100. It is to be appreciated that system 100, components, models or devices can be equipped with communication components (not shown) that enable communication between the system, components, models, devices, etc. over one or more networks.

In accordance with the system 100, the memory 104 can store computer executable components executable by the processor 102. The padding component 108 can return zeroes to the processor without reaching the memory sub-system when the CoLor component 100 interprets a memory request location to be within the zero-padded region. The identification component 112 identifies processing components and parameters that are utilized in the lowered and non-lowered subsets in GEMM operations. The mapping component 114 can determine if an index in a lowered matrix maps to a location within or beyond boundaries in a non-lowered version. The address translation component 110 can translate a given lowered matrix index into a non-lowered index in the input feature space.

The various components (e.g. padding component 108, address translation component 110, an identification component 112, and a mapping component 114, and/or other components) of system 100 (CoLor component 100) can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed can be performed by specialized computers for carrying out defined tasks related to various types of neural networks in their particular context. The subject computer processing systems, methods apparatuses and/or computer program products can be employed to solve new problems that arise through advancements in technology, computer networks, the Internet and the like.

The embodiments of devices described herein can employ artificial intelligence (AI) to facilitate automating one or more features described herein. The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=\text{confidence(class)}$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 2:
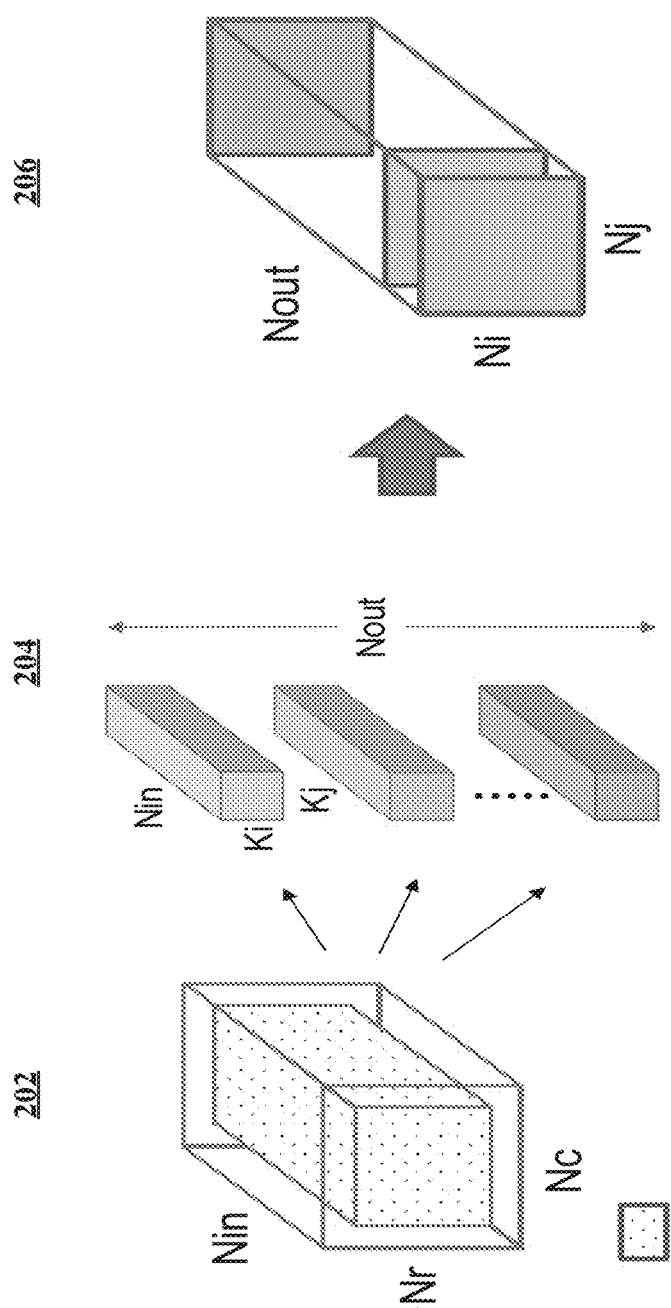
FIG. 2 schematically illustrates 3D matrices involved in a convolution process and 3D data transactions within a convolutional layer.

FIG. 2 illustrates a 3D overview of computations involved within a convolutional layer. Input 202 is 3D matrix with two regions shown within its volume. The dotted volume represents an area holding relevant data and the non-dotted area between the edges of the data volume and an edge of the entire input volume 202 contains non-relevant or zero memory values. Input 202 has three dimensions identified as Nc (width), Nr (height) and Nin as depth. Object 204 depicts 3D slices of different kernel sections where Kj is width, Ki is height and Nin (as is for the input volume) is the corresponding depth. Convolving a kernel with each input feature will produce resultant output 206. More particularly, the 3D kernel is placed over the input and a dot product is performed on overlapping regions. The kernel is much smaller than the input and the result of this dot product multiplication is one set of points in the 3D output volume. Each kernel convolved with its input feature will form a plane of elements reflected in the output structure. Note the 3D input multiplied by each 3D kernel produces a specific colored plane based on the respective kernel in the 3D output cube. The blue kernel multiplication results in the Blue plane, the yellow kernel results in the yellow output plane and so on. The defined parameters for this diagram is as follows. Nin is the number of input features, Nout is the number of output features, N(ij) is the output feature dimensions, K(ij) is the kernel dimensions, N(rc) is the input dimensions, and the input feature dimensions are N(ij)+K(ij)−1. The kernel stride is assumed to be one in this case (stride controls how the filter convolves around the input volume).

Figure 3:
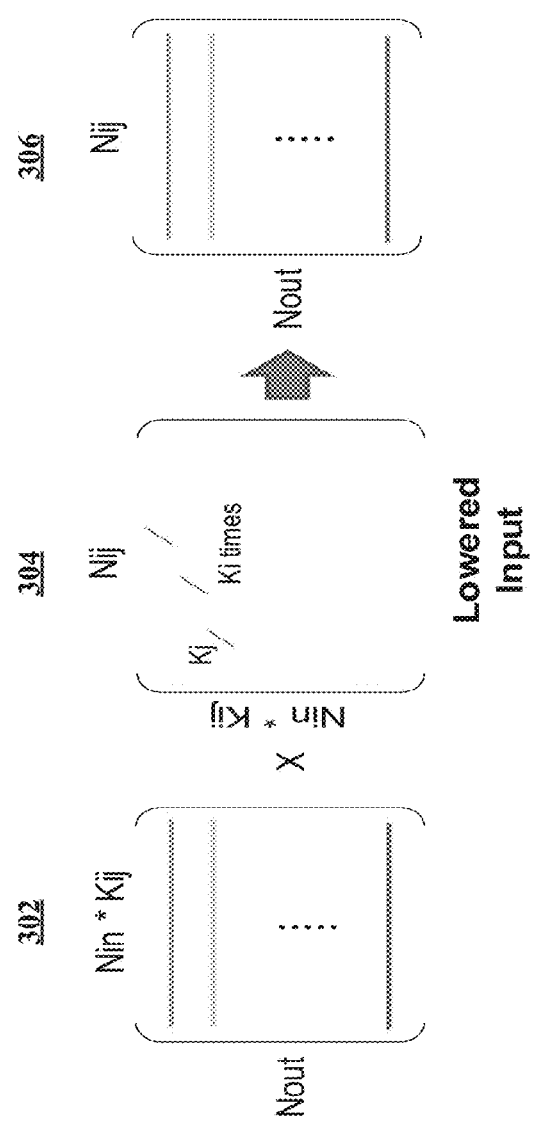
FIG. 3 schematically illustrates a convolution cast as GEMM and matrix multiplication employed when a lowered input volume is utilized in the GEMM process.

FIG. 3 illustrates a convolution cast as GEMM process; it is noted that the first layer in a CNN is the convolution layer. In parallel software implementations the convolution layer is cast as a matrix multiplication operation and assembly level optimized libraries are used to perform various computations. Each kernel volume has been straightened into a single line in matrix 302. During this process of constructing a lowered volume, input elements that are in the input volume (non-lowered volume) are repeated Ku times in lowered matrix 304. This lowering process substantially inflates required memory and bandwidth to facilitate such task. For example, if the window size was 11×11, the result in the lowered matrix would be 121× larger than the size of the input features. After the multiplication between 302 and 304, the resulting product matrix, 306, is Nout×Nij.

Figure 4:
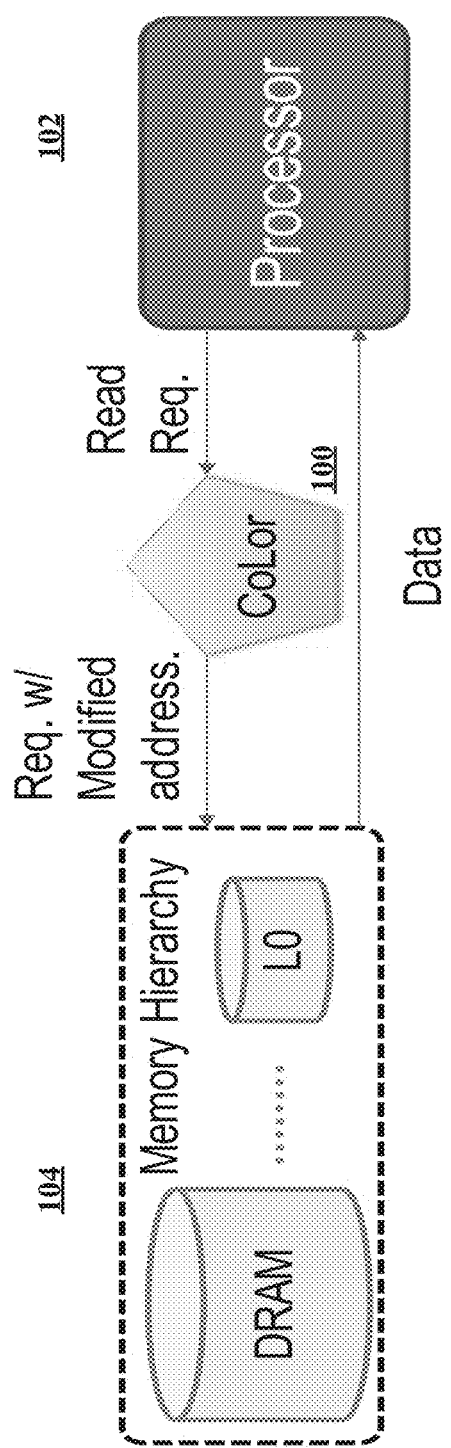
FIG. 4 illustrates a process data flow diagram within a processor and memory hierarchy introducing a CoLor component as an intermediary intervening in read transactions.

FIG. 4 illustrates an implementation of the subject innovation by placing a hardware engine (CoLor component 100) between the processor 102 and memory hierarchy 104 that will intervene in a data transfer process. The processor 102 still executes software code which runs in a non-lowered version, however; memory requests from the processor are now passed through CoLor component 100 prior to reaching destination memory 104; the CoLor component 100 translates the requested memory from the lowered volume into a new modified address corresponding to a location in a non-lowered volume. The CoLor component behaves as an address translator, it converts an index from a lowered matrix into a non-lowered matrix index. This process adds another level of address translation in which a processor provided virtual memory address in the lowered form aborts the transaction to physical memory and instead translates it into a physical address into a non-lowered form. The CoLor component 100 can be viewed as an additional separate unit or merged with a standard address translation process at any suitable level of the memory hierarchy 104. Levels between the CoLor component 100 and the processor 102 would contain the lowered input and everything beyond the CoLor component 100 contains non-lowered output. The CoLor component 100 can save significant memory as the memory hierarchy 104 does not store the lowered matrix (e.g., a 9× to 121× memory reduction). Additionally, bandwidth requirements are also reduced by two facets; the first being requests can be coalesced within the CoLor component 100 if arriving at approximate same time, which eliminates a need for data to travel redundantly across various levels of memory hierarchy. Secondly, the data can be fit into smaller region(s) of memory thus mitigating need for accessing next level of memory leading to potentially higher cache hit rates. The savings in memory and bandwidth required can lead to significant gains in performance.

When multiple writes are sent to the same location, the processing allows the writes to be processed in order of issuance so data is not inadvertently overwritten. The CoLor component 100 intercepts and processes READ transactions and does not intervene in Write transactions.

Figure 5:
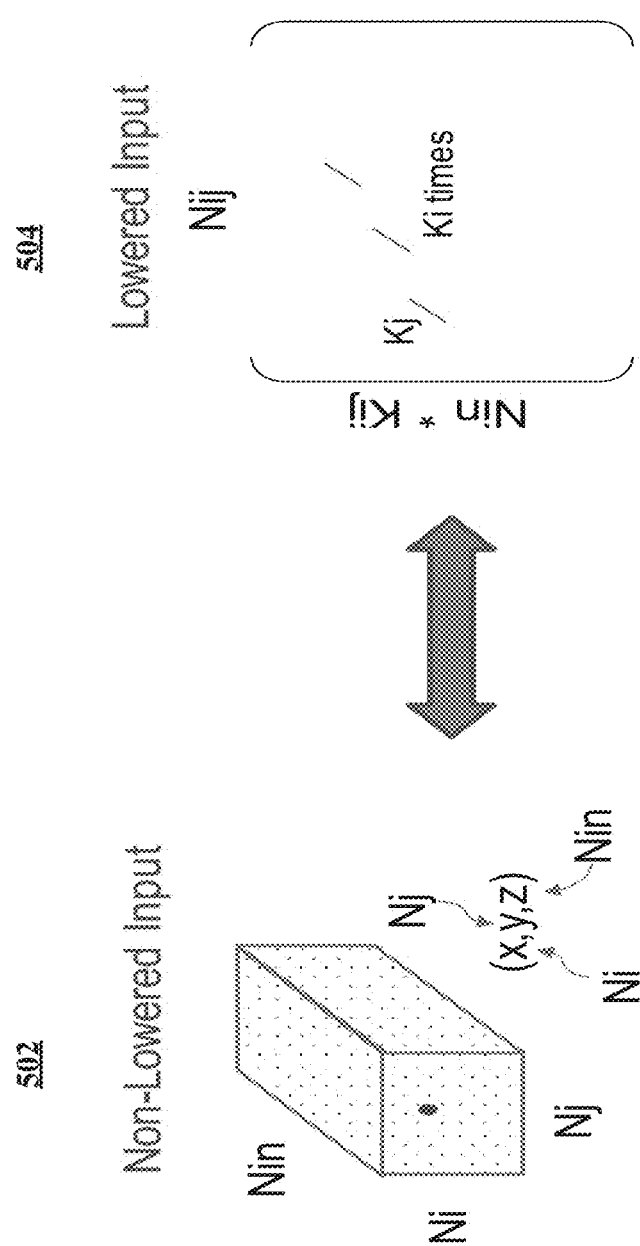
FIG. 5 illustrates an example architecture of a CoLor Address Translation Model for data transferred between non-lowered volume input and lowered volume input along with parameters related to data size and number of data transfer iterations.

FIG. 5 illustrates non-limiting example mathematics and parameters that can be utilized by the CoLor component 100 in connection with the address translation process. Non-lowered input 502 is a 3D matrix with parameters: Nj as the width, Ni as the height and Nin as the depth. Each location in the non-lowered matrix (x, y, z or Ni, Nj, Nin) transfers into Kij different locations in lowered input 504. The row index depends on z-value and column location depends on the x,y location. There are Kj continuous columns and a stride of (Nj−Kj+1 . . . ) repeated Ki times. The starting column index is (x−Ki+1)*Nj+(y−Kj+1). The translation above would be inversed by the CoLor component 100.

Figure 6:
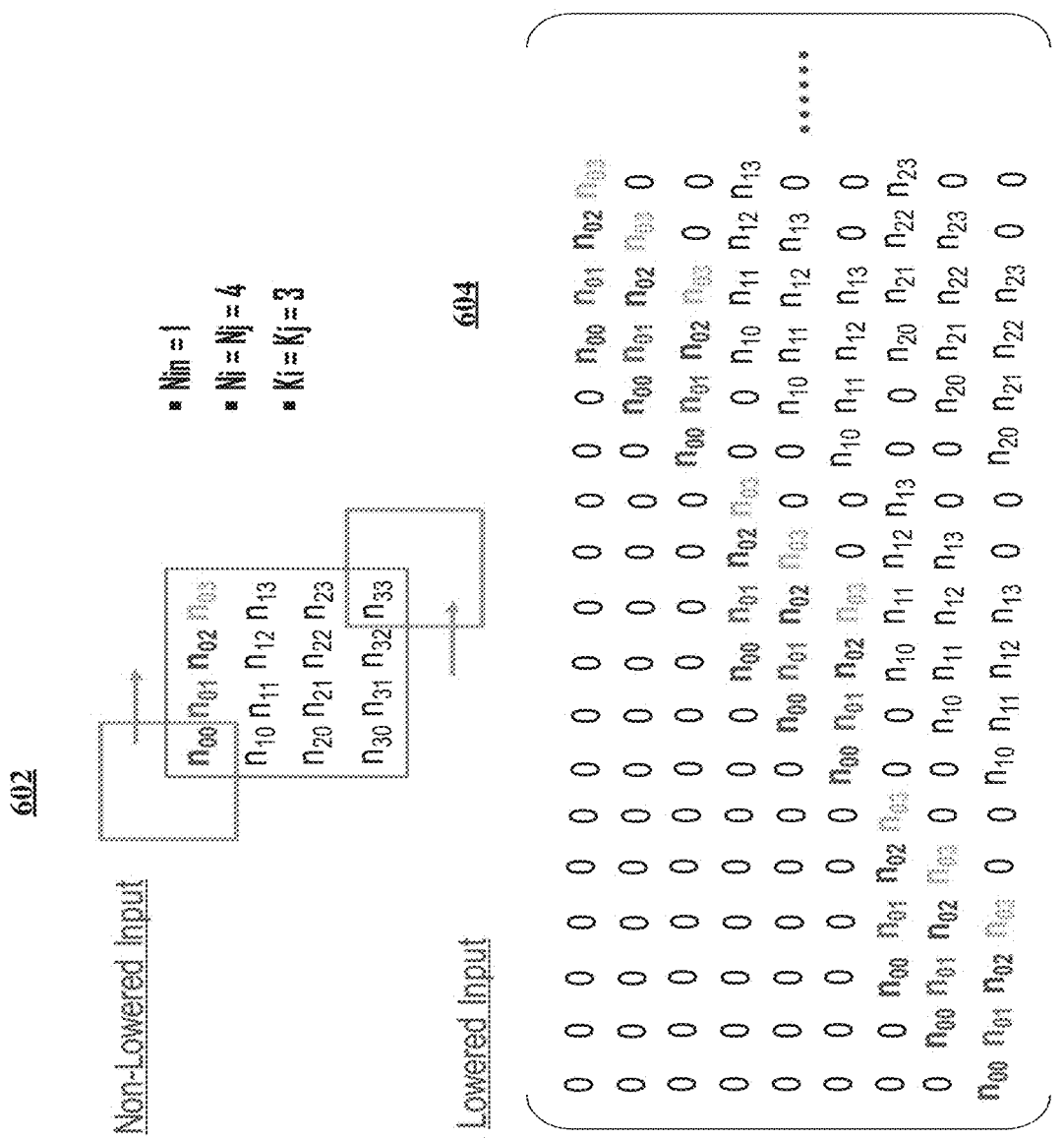
FIG. 6 illustrates an example of the Color Address Translation Model of FIG. 5. implementing a sample set of input and kernel values.

FIG. 6 illustrates an example of the CoLor component's 100 address translation model using sample data sets. A non-lowered input 602 and lowered input 604 are depicted. For this example, Nin=1, Ni=Nj=4, Ki=Kj=3. Therefore, observing the layout in 602, it is clear that $N_{00}$ through $N_{33}$ is a non-lowered input volume. The kernel has 3×3×1 volume (Ki×Kj×1). When placing the kernel over the input features, there may not be a clean overlap, only a partial overlap. In this example, for a 3×3 kernel, only $1/9^{th}$ of the volume will overlap (as shown by the bottom $N_{00}$ in the first column) on 604. As the kernel is traversed through the non-lowered input, more and more regions will overlap and the regions where the kernel does not have a clean overlap are filled with zeroes, referred to as zero padding. As the kernel traverses to the right 2 locations will overlap ($n_{00}$ and $n_{01}$) and the remaining elements are filled with zeros, as it moves further right then three locations will overlap ($n_{00}$, $n_{01}$, $n_{02}$) and so on . . . , etc. There is a pattern that is developed in this process and the logic to capture this pattern is implemented by the CoLor component 100. Based on the lowered input volume 604, $n_{00}$ is displayed nine times in three sequences of three $n_{00}$. When any of the nine indexes are referred to in the lowered input form, the CoLor component 100 executes a task of back mapping into a same address in the non-lowered form ($n_{00}$). Any address that cannot be back mapped into the input volume is padded with zeros. The CoLor component 100 will prohibit those requests from being sent to memory (zeros don't have to be stored in memory), the CoLor component 100 sends a zero back to the processor 102 without sending those memory addresses back to the memory sub-system 104.

Figure 7:
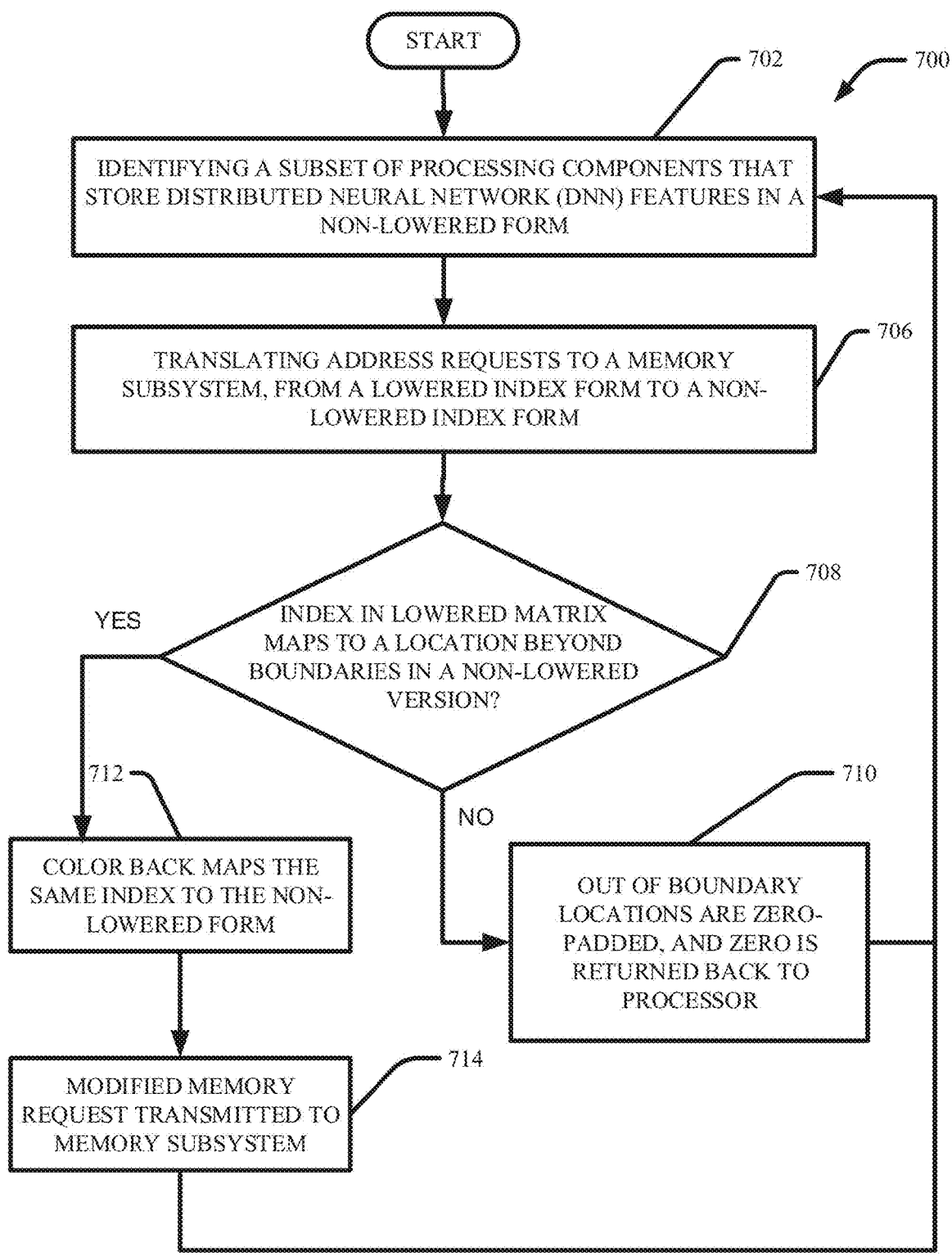
FIG. 7 illustrates an example flow diagram of a CoLor address translation model process used in a GEMM operation within a convolutional layer.

FIG. 7 illustrates a non-limiting methodology 700 (e.g., implemented by CoLor component 100) in accordance with an implementation. For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events.

Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

As noted supra, the subject innovation facilitates reduction in amount of memory utilized and amount of data transmitted between a computer processing unit (CPU) and memory, or between a centralized parameter server and multiple distributed computing nodes in connection with improving efficiency and performance of a neural network. At 702, a subset of processing components that store deep neural network (DNN) features in a non-lowered form are identified (e.g., by identification component 112). At 706, address requests to a memory subsystem are translated, from a lowered index form to a non-lowered index form (e.g., by address translation component 110). At 708, a determination is made regarding whether the index in lowered matrix maps to a location beyond boundaries in a non-lowered version (e.g., by mapping component 114). If NO, at 710, out of boundary locations are zero-padded, and zero is returned to a processor (e.g., by padding component 108). If YES, at 712, the same index is mapped to the non-lowered form (e.g., by mapping component 114). At 714, the modified memory request is transmitted to a memory subsystem (e.g., by CoLor component 100). The subject invention introduces an intermediate convolutional lowering (CoLor) component 100 that optimizes computing required to facilitate such processes. The CoLor component implements 100 an address translation logic, that is transparent to both processor and memory sub-systems. Software executing on the processor still implements convolutional layers as a GEMM operation, producing memory requests for indices in the lowered input feature matrix. However, the input features are stored in memory only in the non-lowered form. The memory request from the processor 102 is first received by the CoLor component 100. The CoLor component 100 maps location(s) in the lowered matrix to equivalent location(s) in non-lowered input feature representation. The modified memory request is sent to the memory subsystem 104, which then transmits the data back to the processor 102. The CoLor component 100 substantially reduces memory foot-print by $K^2$ times (therefore potentially negating the $K^2$ replication expanded (as referred to previously during the lowering process). It also improves bandwidth, as multiple requests from the processor map to a same location in memory, and requests can be merged together. The CoLor component 100 can streamline zero padding in convolution. When a memory request reaches the CoLor component 100 and it identifies an access location to fall within a zero-padded region, it simply returns a zero back to the processor 102, without forwarding the request to the memory subsystem 104.

Figure 8:
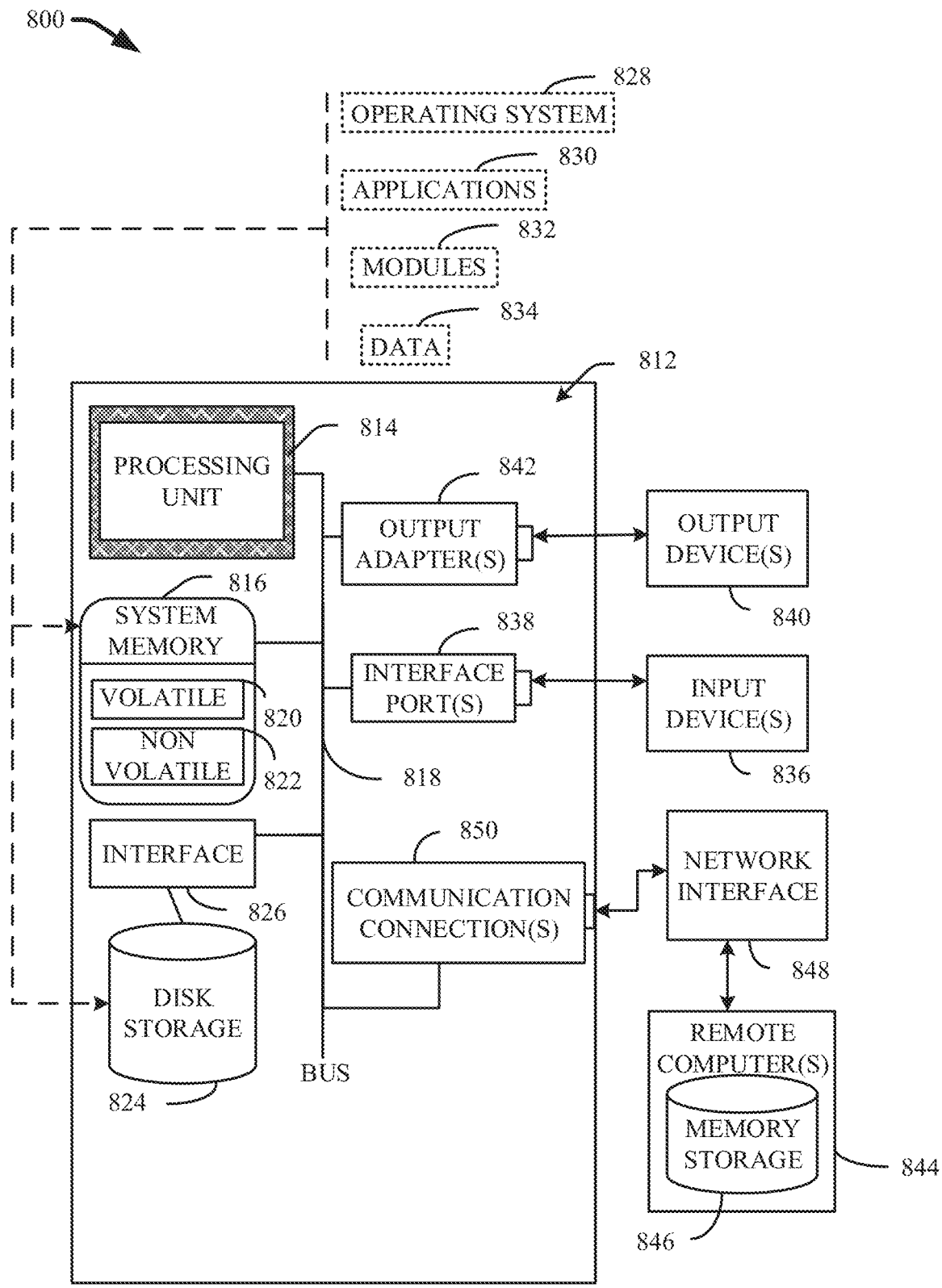
FIG. 8 is a schematic diagram of an example operating environment in accordance with one or more implementations described herein.

To provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

A suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between users and the basic computer resources described in the suitable operating environment 801. Such software can also include, for example, an operating system 828. Operating system 828, which can be stored on disk storage 824, acts to control and allocate resources of the computer 812. System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s)

836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection (s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability;

multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a processor that executes computer executable components stored in the memory, wherein the computer executable components comprise:
      an identification component that identifies processing components that execute computations in deep neural networks (DNNs) in which convolutions are realized as general matrix to matrix multiplications (GEMM) operations, and identifies a subset of the processing components that store deep neural network (DNN) features in a non-lowered form; and
      an address translation component that translates address requests, generated by the subset of processing components to a memory subsystem, from a lowered index form to a non-lowered index form.

2. The system of claim 1 further comprising a mapping component that coalesces lowered index requests that map to a same non-lowered index.

3. The system of claim 1, further comprising a padding component wherein if an index in lowered matrix maps to a location beyond boundaries in a non-lowered version then out of boundary locations are zero-padded.

4. The system of claim 3, wherein the address translation component returns a zero to the processor without passing a request to the memory subsystem.

5. The system of claim 1, wherein the processor implements a convolution as general matrix to matrix multiplications, wherein the memory does not store a lowered matrix.

6. The system of claim 1, wherein memory requests from the processor pass through the address translation component before reaching the memory sub-system.

7. The system of claim 1, wherein the address translation component converts the lowered matrix index form to the non-lowered index form in an input feature space.

8. The system of claim 1, wherein input data is read and not written.

9. The system of claim 7, wherein the address translation component performs an inverse hash function in connection with translation of the lowered matrix index form and the non-lowered index form.

10. A computer-implemented method, comprising:
    identifying by a system operatively coupled to a processor that is operatively coupled to a memory, processing components that execute computations in deep neural networks (DNNs) in which convolutions are realized as general matrix to matrix multiplications (GEMM) operations, and identifies a subset of the processing components that store deep neural network (DNN) features in a non-lowered form; and
    translating by the system, address requests, generated by the subset of processing components to a memory subsystem, from a lowered index form to a non-lowered index form.

11. The method of claim 10 further comprising coalescing, by the system, lowered index requests that map to a same non-lowered index.

12. The method of claim 10, further comprising wherein if an index in lowered matrix maps to a location beyond boundaries in a non-lowered version then out of boundary locations are zero-padded by the system.

13. The method of claim 12, wherein the system does not pass the request to the memory sub-system.

14. The system of claim 10, further comprising implementing a convolution as general matrix to matrix multiplications, wherein the memory does not store a lowered matrix.

15. The system of claim 10, wherein memory requests from the processor pass through an address translation component before reaching the memory sub-system.

16. A non-transitory computer program product comprising a computer readable storage medium having program instructions embodied therewith, the program instructions executable by processor to cause the processor to:
- identify by a system operatively coupled to a processor that is operatively coupled to a memory, processing components that execute computations in deep neural networks (DNNs) in which convolutions are realized as general matrix to matrix multiplications (GEMM) operations, and identifies a subset of the processing components that store deep neural network (DNN) features in a non-lowered form; and
- translate by the system, address requests, generated by the subset of processing components to a memory subsystem, from a lowered index form to a non-lowered index form.

17. The non-transitory computer program product of claim 16, the program instructions further cause the processor to: coalesce, by the system, lowered index requests that map to a same non-lowered index.

18. The non-transitory computer program product of claim 16, the program instructions further cause the processor to: wherein if an index in lowered matrix maps to a location beyond boundaries in a non-lowered version then out of boundary locations are zero-padded by the system.

19. The non-transitory computer program product of claim 12, the program instructions further cause the processor to implement a convolution as general matrix to matrix multiplications, wherein the memory does not store a lowered matrix.

20. The non-transitory computer program product of claim 12, the program instructions further cause the processor to pass memory requests from the processor through an address translation component before reaching the memory sub-system.

* * * * *